(12) United States Patent
Trere

(10) Patent No.: US 12,088,741 B2
(45) Date of Patent: Sep. 10, 2024

(54) MUTUAL AUTHENTICATION PROTOCOL FOR SYSTEMS WITH LOW-THROUGHPUT COMMUNICATION LINKS, AND DEVICES FOR PERFORMING THE SAME

(71) Applicant: Microchip Technology Incorporated, Chandler, AZ (US)

(72) Inventor: Paolo Trere, San Jose, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/948,101

(22) Filed: Sep. 3, 2020

(65) Prior Publication Data

US 2021/0184869 A1  Jun. 17, 2021

Related U.S. Application Data

(60) Provisional application No. 62/948,951, filed on Dec. 17, 2019.

(51) Int. Cl.
*H04L 9/32* (2006.01)
*H04L 9/08* (2006.01)
*H04L 9/16* (2006.01)

(52) U.S. Cl.
CPC .......... *H04L 9/3273* (2013.01); *H04L 9/0825* (2013.01); *H04L 9/16* (2013.01); *H04L 9/3247* (2013.01); *H04L 9/3263* (2013.01)

(58) Field of Classification Search
CPC ... H04L 9/3273; H04L 9/0825; H04L 9/3247; H04L 9/3263
See application file for complete search history.

(56) References Cited

U.S. PATENT DOCUMENTS

| | | | | |
|---|---|---|---|---|
| 9,258,117 | B1* | 2/2016 | Roth | H04L 63/166 |
| 9,621,525 | B2* | 4/2017 | Brumley | H04L 63/061 |
| 9,794,249 | B1* | 10/2017 | Truskovsky | H04L 9/006 |
| 10,243,741 | B2 | 3/2019 | Cohen et al. | |
| 10,887,310 | B2* | 1/2021 | Bernsen | H04W 12/06 |
| 2005/0188193 | A1 | 8/2005 | Kuehnel et al. | |
| 2005/0216736 | A1 | 9/2005 | Smith | |
| 2007/0162751 | A1* | 7/2007 | Braskich | H04L 63/0869 |
| | | | | 713/169 |

(Continued)

FOREIGN PATENT DOCUMENTS

| | | |
|---|---|---|
| CN | 101516090 A | 8/2009 |
| CN | 101523801 A | 9/2009 |

(Continued)

OTHER PUBLICATIONS

Dolev, "Vehicle authentication via monolithically certified public key and attributes", Jul. 5, 2015, Springer Science (Year: 2015).*

(Continued)

*Primary Examiner* — John B King
*Assistant Examiner* — Alex D Carrasquillo
(74) *Attorney, Agent, or Firm* — TraskBritt

(57) ABSTRACT

Discussed is a mutual authentication protocol, and systems, methods and devices implementing the same. Such a protocol may be used, as a non-limiting example, by devices coupled by low throughput connections for speedy authentication to establish a secure communication session.

20 Claims, 9 Drawing Sheets

(56) References Cited

U.S. PATENT DOCUMENTS

| | | | |
|---|---|---|---|
| 2007/0283153 A1* | 12/2007 | Metke | H04W 12/06 |
| | | | 713/169 |
| 2008/0092211 A1 | 4/2008 | Klemets et al. | |
| 2009/0158414 A1* | 6/2009 | Chaudhry | H04L 9/3263 |
| | | | 726/10 |
| 2009/0217043 A1* | 8/2009 | Metke | H04W 12/069 |
| | | | 713/171 |
| 2009/0249074 A1* | 10/2009 | Madhavan | H04L 9/3263 |
| | | | 713/176 |
| 2011/0087883 A1* | 4/2011 | Campagna | H04L 9/3265 |
| | | | 713/156 |
| 2011/0202755 A1 | 8/2011 | Orsini et al. | |
| 2014/0173287 A1* | 6/2014 | Mizunuma | H04L 63/0407 |
| | | | 713/176 |
| 2016/0373418 A1* | 12/2016 | Ståhl | G06F 21/44 |
| 2018/0375870 A1* | 12/2018 | Bernsen | H04L 63/10 |
| 2019/0074977 A1 | 3/2019 | Fries et al. | |
| 2022/0224551 A1* | 7/2022 | Le Saint | H04L 63/0428 |

FOREIGN PATENT DOCUMENTS

| | | | | |
|---|---|---|---|---|
| CN | 106452782 A | | 2/2017 | |
| CN | 107396350 A | | 11/2017 | |
| CN | 108366069 A | * | 8/2018 | ........... H04L 63/083 |
| CN | 110190955 A | | 8/2019 | |
| DE | 102014204252 A1 | * | 9/2015 | ............. G06F 21/33 |
| FR | 3030821 A1 | * | 6/2016 | ........... G06F 21/123 |
| KR | 10-2012-0053929 A | | 5/2012 | |
| WO | 2009/103214 A1 | | 8/2009 | |
| WO | 2017/045552 A1 | | 3/2017 | |

OTHER PUBLICATIONS

Dolev et al.; "Vehicle authentication via monolithically certified public key and attributes", Springer, Jul. 2015, pp. 879-892 (Year: 2015).*

Dolev et al. "Vehicle authentication via monolithically certified public key and attributes", Springer Science, pp. 879-895, 2015 (Year: 2015).*

Chinese First Office Action and Search Report for Chinese Patent Application No. 202080086694.9, dated Oct. 27, 2023, 28 pages with English translation.

Notice on Grant of Patent Right for Invention and Search Report of Chinese Patent Application No. 202080086694.9, mailed Jun. 6, 2024, 6 pages with English translation.

Second Office Action of Chinese Patent Application No. 202080086694.9, issued Mar. 30, 2024, 9 pages with English translation.

* cited by examiner

MUTUAL AUTHENTICATION PROTOCOL FOR SYSTEMS WITH LOW-THROUGHPUT COMMUNICATION LINKS, AND DEVICES FOR PERFORMING THE SAME

CROSS-REFERENCE TO RELATED APPLICATION

This application claims the benefit of the priority date of U.S. Provisional Patent Application No. 62/948,951, filed Dec. 17, 2019, and titled "MUTUAL AUTHENTICATION PROTOCOL FOR SYSTEMS WITH LOW-THROUGHPUT COMMUNICATION LINKS AND DEVICES FOR PERFORMING THE SAME," the disclosure of which is incorporated herein in its entirety by this reference.

FIELD

Embodiments discussed herein relate, generally, to authentication between devices. More specifically, some embodiments relate to mutual authentication protocols between devices using public/private key techniques.

BACKGROUND

Mutual authentication refers to a process by which two parties authenticate each other at substantially the same time. Mutual authentication is typically used so that two parties can engage in some activity where trust is important, such as communication or cooperation between two computing devices (e.g., mobile devices, wearable devices, automobiles, controllers, infrastructure devices, medical devices, servers and server clients, without limitation). Specific rules for performing mutual authentication are typically defined in mutual authentication protocols. In computing, such protocols typically define specific quantity and quality of messages and data exchanged by the parties as the parties attempt to authenticate. The inventor of this disclosure appreciates that in computing, mutual authentication can be difficult over low throughput connections, such as the types sometimes found in edges of Internet-of-Things (IoT) networks where, as non-limiting examples, parties mutually authenticate before transmission, processing, routing, filtering, translation or storage of data moving between networks.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
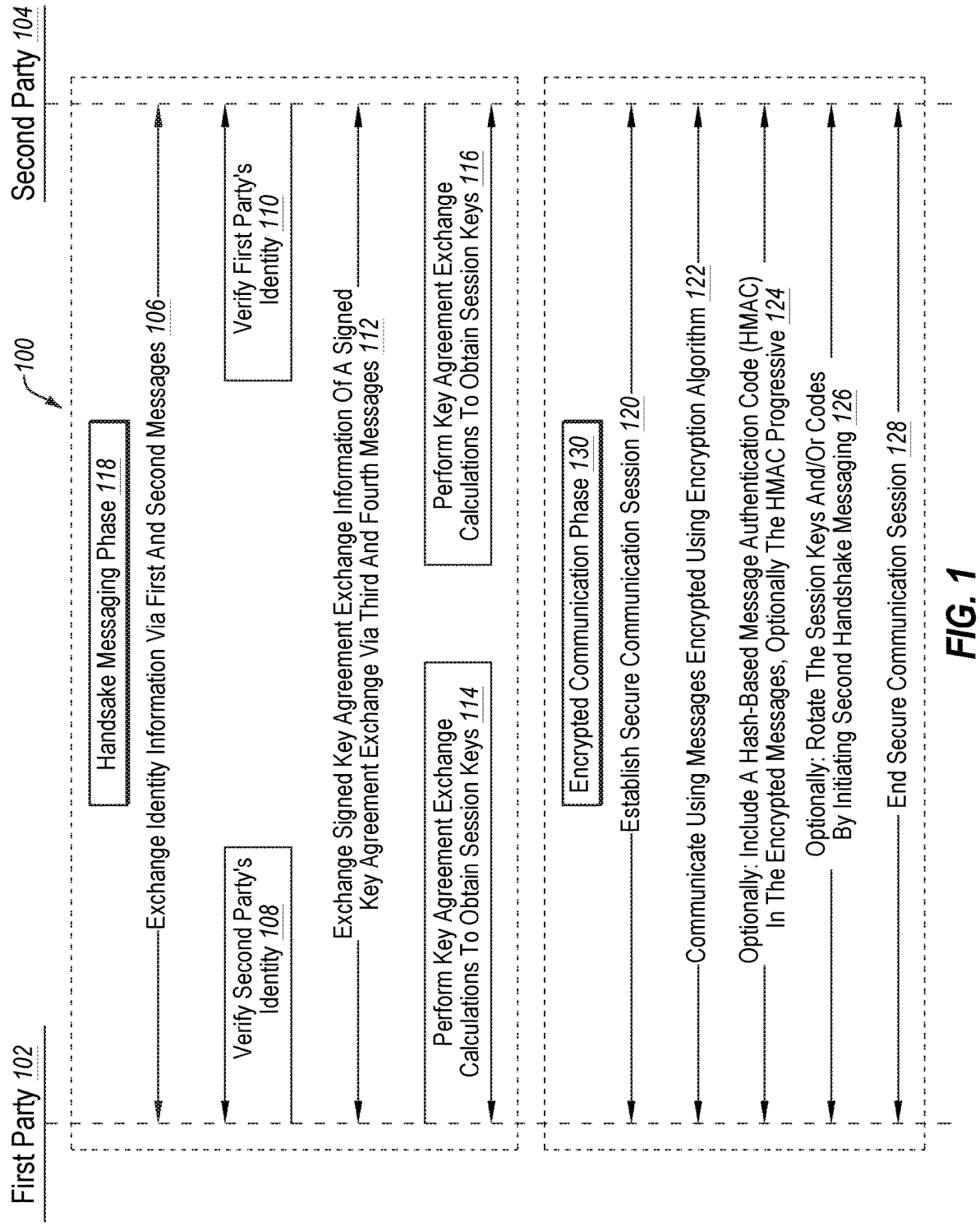
FIG. 1 illustrates an authentication protocol in accordance with one or more embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, any relational term, such as "over," "under," "on," "underlying," "upper," "lower," etc., is used for clarity and convenience in understanding the disclosure and accompanying drawings and does not connote or depend on any specific preference, orientation, or order, except where the context clearly indicates otherwise.

Herein, the term "coupled" and derivatives thereof may be used to indicate that two or more elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The term "connected" may be used in this description interchangeably with the term "coupled," and has the same meaning unless expressly indicated otherwise or the context would indicate otherwise to a person having ordinary skill in the art.

When used herein, the term "message" includes without limitation a message communicated using one or more packets.

Low-throughput wired and wireless connections ("low-throughput connections") are advantageous in systems of "simple" devices (e.g., limited in terms of processing cores, power supply, or available memory, without limitation) because they require less intensive processing and operate with lower power than higher throughput connections. So, low-throughput connections are typically used among devices that, by way of non-limiting example, operate with lower battery power, simpler cores, and greater scale than devices configured for higher throughput connections.

Communications on low-throughput connections are vulnerable to cyberattacks because the connected devices typically do not support mutual device authentication. Mutual authentication typically requires complex processing beyond the reasonable capability of the devices, and heavy message payloads unsuitable for low-throughput connections. So, systems of devices coupled by low-throughput connections may not be suitable for applications that require mutual authentication, but systems of devices coupled by high-throughput connections and having more complex cores and available memory are suitable for applications that require mutual authentication.

The inventor of this disclosure appreciates that systems of low-throughput related devices and communications moving thereon are vulnerable to cyber-attacks, including, without limitation, so called Man-In-The-Middle (MITM) attacks where an attacker relays and modifies legitimate communications between two devices, and the modifications may enable the attacker to gain access to a system, a network, or a device, without limitation.

Some conventional protocols that allegedly provide for mutual authentication of devices coupled by low-throughput connections known to the inventor of this disclosure, generally, forego at least one of the accepted pillars of security: authentication, integrity, or confidentiality. Other conventional protocols that allegedly provide for mutual authentication of devices coupled by low-throughput connections known to the inventor of this disclosure may be too slow to ensure proper applicability.

The inventor of this disclosure appreciates a need for mutual authentication protocols and devices that may implement the same, which may be used in systems of low-throughput related devices. More specifically, the inventor of this disclosure appreciates a need for a mutual authentication protocol, usable in low-throughput connections and applications including low-throughput connections, whereby two parties (e.g., two devices, without limitation) may ensure the identity of the party they are in communication with and establish a secure session for exchanging encrypted data. Though low-throughput connections are a specific application, use of mutual authentication protocols discussed herein with connections where throughput is not a limiting design consideration (e.g., fast throughput connections, without limitation) does not exceed the scope of this disclosure.

In one or more embodiments, when two or more parties desire to communicate, each party's identity is verified through an Elliptic-Curve-Digital Signature Algorithm (ECDSA) verification process. As part of the ECDSA verification process, advantageously the parties exchange identity information in a limited manner (i.e., in terms of number of message and size of data (in bytes) exchanged). While limited, the identity information is sufficient, alone or in combination with other information known by the parties, to successfully perform the ECDSA verification process. Once verified, the parties exchange (e.g., perform a key exchange agreement protocol, without limitation) a properly signed Elliptic Curve Diffie-Helman (ECDH) session key(s) used to derive session keys for communication. The session keys may be used to encrypt communication (e.g., messages, certificates, codes, without limitation) according to an encryption cipher such as a symmetric encryption algorithm (e.g., Advanced Encryption Standard (AES) 128, AES 256, without limitation), a stream cipher (e.g., Salsa20, Rivest Cipher (RC) 4, RC5, or RC6, without limitation), or a symmetric-key tweakable block cipher (e.g., ThreeFish, without limitation), without limitation.

FIG. 1 is a swim lane diagram depicting an authentication protocol 100, in accordance with one or more embodiments. In the specific non-limiting example depicted by FIG. 1, a first party 102 and a second party 104 perform authentication protocol 100, which may include two phases: a handshake messaging phase 118 and an encrypted communication phase 130 upon successfully performing handshake messaging phase 118.

During handshake messaging phase 118, first party 102 and second party 104 exchange information as part of an attempt to agree on a set (or sets) of cryptographic keys that the parties will use to encrypt and decrypt messages during a secure communication session between the parties. Such cryptographic keys may be referred to herein as "session keys." More specifically, the parties attempt to agree on an intermediate key from which multiple session keys may be derived, such an intermediate key referred to herein as a "session secret."

Performing handshake messaging phase 118 may also be characterized herein as exchanging messages for "establishing a secure communication session" between parties, here first party 102 and second party 104.

In operation 106, first party 102 and second party 104 exchange respective identity information by performing first messaging of handshake messaging phase 118. First messaging may include each of the first party 102 and second party 104 sending a message (a first and second message, respectively) with its respective identify information (which may include an optional cryptographic nonce), which message is received by the other party.

Identity information may include, or be in the form of, one or more digital certificates for sharing information about the party, about the party's public key, about a signer of a party's certificate, and about a certificate authority that authenticates the signer. A public key certificate is a digital certificate authenticating ownership of a public key. A party's public key certificate may be referred to herein a "device certificate." Use of digital certificates that authenticate the identity of an entity for reasons other than authenticating ownership of a public key do not exceed the scope of this disclosure.

Generally, the role of a signer is to bring in an entity that has been authenticated (signed) by a certificate authority and thus enables devices such as first party 102 and second party 104, to be signed (authenticated) with a private key, provided by the signer carried (e.g., stored, without limitation) by such devices with less risk than carrying a certificate authority's private key that would have to be subject to extensive efforts to protect it and keep it secure.

A signer's certificate may be signed (i.e., authenticated) by a certificate authority, and a device certificate may be signed (i.e., authenticated) by the signer. In some embodiments, identity information may include a signed device certificate portion and a signed public key certificate of a signer arranged in a certificate chain.

Identity information exchanged by the parties may include a portion of a device certificate, the portion signed by a signer authenticated by a certificate authority. As a non-limiting example, identity information may be included in an X.509 formatted certificate that corresponds to a portion of a device certificate. X.509 is presently defined by the ITU Telecommunication Standardization Sector (ITU-T). In various embodiments, a signed device certificate portion may include some, but not all, of the information used in a transport layer security (TLS) certificate, a secure socket layer (SSL) certificate, or similar type certificate. A device certificate portion, signed or unsigned, may have a public key certificate format such as according to the X.509 format (including extensions thereof). Such a public key certificate format may include a specific certificate structure that defines specific fields for specific information and a size of a respective field in bytes. While some, or a totality of, information of a signed device certificate portion exchanged by the parties may be compressed, a device certificate portion, signed or unsigned, is in contrast to a compressed public key certificate where a totality of a public key certificate is recoverable solely by decoding the bits of the compressed public key certificate.

Each party may recover the other party's device certificate from a signed device certificate portion, as described further below, and use respective recovered device certificates to verify the other party's identity, as a non-limiting example, using an ECDSA verification process.

In some embodiments, a device certificate or device certificate portion, signed or unsigned, may include instructions for requesting a public key from a sender, that is, a device certificate portion provided by first party 102 may include instructions for requesting a public key from first party 102, and a device certificate portion provided by second party 104 may include instructions for requesting a public key from second party 104. In some embodiments, the instructions may be encoded with a device certificate or device certificate portion and may be recovered and/or performed, a non-limiting example, as part of an ECDSA verification process.

In operation 108 and operation 110, each party verifies the other party's identity using the exchanged identity information, as a non-limiting example, using an ECDSA verification process. In a case of a device certificate and signer certificate arranged in a certificate chain, for each party, verification in operations 108 and 110 may include verifying a signer's signature applied to the signed device certificate portion using ECDSA verification and a signer's public key included with a signer's public key certificate signed by a certificate authority. The certificate authority's signature applied to the signer's public key certificate may be verified using ECDSA verification and a certificate authority's public key delivered separately from authentication protocol 100 using a trusted delivery procedure.

If both first party 102 and second party 104 verify the other party, then they obtain the other party's respective public key (sent in the other party's signed device certificate portion) and may proceed to operation 112. If either of the parties does not verify the other party then authentication protocol 100 may re-perform operations 108, 110 and 112 until both parties' respective identities are verified (or some threshold number of attempts to verify have been performed) or authentication protocol 100 may end.

In operation 112, first party 102 and second party 104 exchange signed key agreement exchange information of a signed key agreement exchange via second messaging of handshake messaging phase 118. Second messaging may include each party sending a message (a third and fourth message, respectively) with its signed key agreement exchange information, which message is received by the other party. Signed key agreement exchange information may include each party's signed ephemeral public key, generation of which is discussed below.

In some embodiments, the first and second cryptographic nonces exchanged in operation 106 and process 200 may be used by the parties to perform some of the operations of a signed key agreement exchange. As non-limiting example, a cryptographic nonce, including without limitation the first and second cryptographic nonces of process 200 may be a one-time-use number (e.g., an arbitrary number such as a time variant number, random number, pseudorandom number, or combinations thereof, without limitation) provided by first party 102 and second party 104, respectively. First party 102 and second party 104 use the first and second cryptographic nonces, respectively, to identify a specific authentication session (i.e., an authentication session corresponding to a particular execution of authentication protocol 100), a specific communication or a specific secure communication session and associate messages therewith. An attacker cannot, or at least finds it more difficult to, copy and re-send encrypted messages that a party will accept—i.e., a so-called "replay attack," where a receiver treats an attacker's message as if it were sent by an authenticated sender.

In operation 114 and operation 116, first party 102 and second party 104 each perform one or more calculations of a protocol for the signed key agreement exchange. In some embodiments, calculations of operation 114 and operation 116 include obtaining a session secret. In various embodiments, the session secret may be usable by one or both parties to obtain or recover session keys. As a non-limiting example, a session secret may be obtained by performing an Elliptic Curve Diffie-Hellman (ECDH) algorithm and referred to as an "ECDH session key." A non-limiting example of an ECDH session key type session secret is a pre-master key obtainable by performing a specific ECDH algorithm using a combination of signed public ephemeral keys exchanged by first party 102 and second party 104 in operation 112, and private ephemeral keys generated by the first party 102 and second party 104.

In some embodiments, authentication protocol 100 obtains one or more session keys by performing a specific ECDH algorithm (e.g., an ECDH key agreement protocol) using a combination of signed public keys and respective private keys at first party 102 and second party 104. Non-limiting examples of session keys obtainable from an ECDH session key include an AES combined 32 byte key obtained by performing an HKDF derivation function to the ECDH session key, 16 byte AES and 16 byte AESIV keys derived from the AES combined 32 byte key, and an HMAC 32 byte key.

In some embodiments, each party performing authentication protocol 100 may be configured to obtain a hash-based message authentication code (HMAC) key or a salted-HMAC key by applying a hash-based simple key derivation function (HKDF) to a session secret (e.g., EDCH session key) and one, or both of the first and second cryptographic nonces obtained during process 200. Upon obtaining one or more of the session keys and HMAC key, each of first party 102 and second party 104 may use those session keys and HMAC key to encrypt data and perform encrypted communication as part of a secure communication session.

Notably, operations of handshake messaging phase 118 of authentication protocol 100 may be performed by exchanging a specific or maximum number of messages and bytes between first party 102 and second party 104. In the specific non-limiting example depicted by FIG. 1, four messages (i.e., each party sending a message including identity information and a cryptographic nonce, and each party sending a message including signed ephemeral public keys), and a total of 960 bytes (first and second messages, each: 320 byte certificate chain+32 byte cryptographic nonce; and second and third messages, each: 64 byte ephemeral public key and 64 byte digital signature—together forming the signed ephemeral public key) are exchanged between first party 102 and second party 104 during operation 106 and operation 112. A typical TLS protocol known to the inventor of this disclosure uses several kilobytes of data to perform an equivalent handshake phase to handshake messaging phase 118.

Notably, at least three session keys for each secure communication session may be obtained in embodiments of authentication protocol 100.

As discussed above, operation 106, operation 108, operation 110, operation 112, operation 114, and operation 116 form some, or a totality, of handshake messaging phase 118 of authentication protocol 100. Operation 120, operation 122, operation 124, and operation 126, and operation 128, to be described further below, include some, or a totality, of operations of an encrypted communication phase 130 of authentication protocol 100.

In operation 120, authentication protocol 100 establishes a secure communication session between first party 102 and second party 104. As a non-limiting example, the secure communication session may be deemed established in response to first party 102 and second party 104 successfully performing handshake messaging phase 118.

In operation 122, first party 102 and second party 104 communicate using a secure communication link, and more specifically, using messages encrypted using an encryption algorithm and the session keys derived by performing operation 112, operation 114, and operation 116. Each party may use the derived session keys to decrypt the encrypted messages received from the other party.

In some embodiments, messages are encrypted using AES 128. In some embodiments, cipher block chaining (CBC) (or other chaining mechanism) may be used to introduce message dependence to the encoding and then each cipher text block may be encrypted using the selected encryption algorithm (e.g., AES 128, without limitation).

In optional operation 124, authentication protocol 100 may communicate the messages encrypted as described with reference to operation 122 where the messages optionally include HMACs.

In optional operation 126, authentication protocol 100 may periodically or randomly perform a key rotation of one or more of the codes and/or keys obtained during authentication protocol 100, including without limitation, rotation of the session secret and session keys, rotation of the session key, rotation of the first and second cryptographic nonces, and rotation of the HMAC key and HMACs. Such a rotation of the session secret and session keys, rotation of the session key, rotation of the first and second cryptographic nonce, and rotation of the HMAC key and HMACs may be accomplished by initiating a second instance of at least a portion of handshake messaging phase 118, particularly operations 112, 114 and 116.

In some embodiments, operations 124 or 126 may include a number of operations for ensuring a "progressive" and "unique" HMAC key for each message. An HMAC may be used as a type of signature: given a message of arbitrary length, the message is first hashed with a hashing algorithm (e.g., SHA256, without limitation) and then combined with a session secret and one or more of the first and second cryptographic nonces to obtain a type of fingerprint associated with that specific message—the HMAC. The fingerprint is associated with a specific message because the hashing algorithm associates the fingerprint to the contents of the message itself (similar to a pure SHA) and optionally an HMAC key (which adds some strength because to calculate the message correctly the HMAC key is necessary).

Given a constant message, an HMAC calculated with a given HMAC key, will always be the same. So, to obtain a different HMAC for each message (even for messages having the same content), a "salt" is added to the calculation of the HMAC so that the HMAC depends on the salt, message, and HMAC key. In order to use a "salt," the manner of calculating the salt is known to each party in advance. So, in some embodiments, a known "salt" (e.g., the session secret, without limitation) is applied to the first calculation of the HMAC and then each successive HMAC is calculated using the previous HMAC and HMAC key—referred to herein as "progressive" HMAC generation. In operation 128, authentication protocol 100 ends the secure communication session established in handshake messaging phase 118. As a non-limiting example, the secure communication session may end responsive to an affirmative message by one of the parties instructing (e.g., instructing or informing, without limitation) the other party to end the communication session. As another non-limiting example, the secure communication session may end responsive to a threshold number of messages being communicated between the parties. As another non-limiting example, the secure communication session may end responsive to either party detecting the expiration (e.g., using time or message counter, without limitation) of cryptographic information without rotation by one or more of the parties, such as expiration of a session secret, session key, HMAC key or HMAC.

Figure 2:
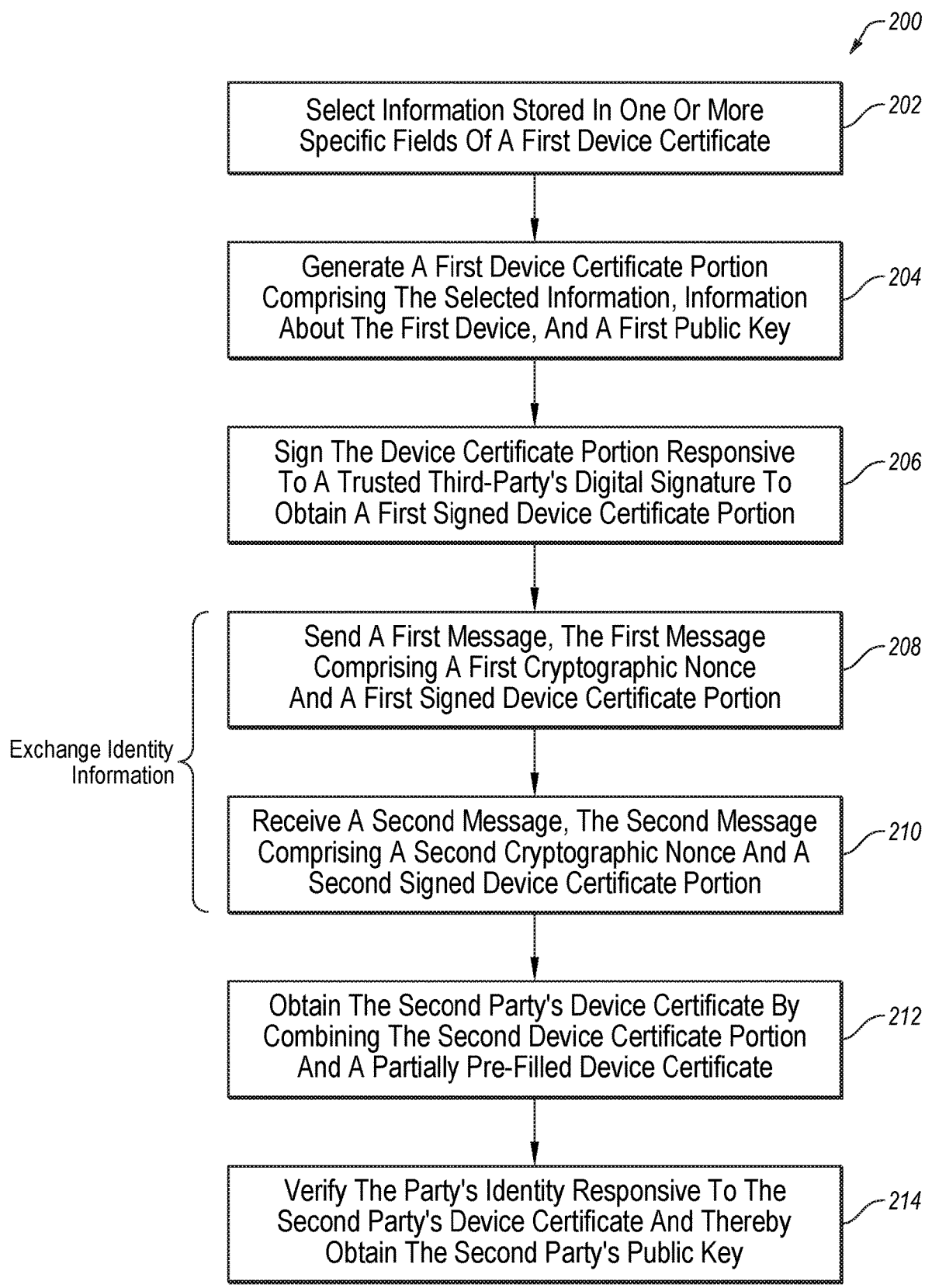
FIG. 2 illustrates a process in accordance with one or more embodiments.

FIG. 2 is a flowchart depicting a process 200 for exchanging identity information and verifying identity as part of a handshake messaging phase of an authentication protocol, in accordance with one or more embodiments, such as in operation 106, operation 108, and operation 110 of authentication protocol 100, without limitation.

In operation 202, process 200 selects information stored in one or more specific fields of a first device certificate of a party.

In operation 204, process 200 generates a first device certificate portion comprising the selected information, a party's own public key (i.e., first public key) generated from the party's private key, and information about the party. The selected information, first public key, and information about the party may be stored in fields corresponding to the one or more specific fields of the first device certificate of operation 202.

At operation 206, process 200 signs the first device certificate portion responsive to a trusted third-party's digital signature, such as a signer authenticated by a certificate authority, to obtain a first signed device certificate portion.

At operation 208, process 200 sends a first message of a handshake messaging phase of the authentication protocol (e.g., handshake messaging phase 118). The first message includes the party's own cryptographic nonce (i.e., a first cryptographic nonce) and the first signed device certificate portion obtained in operation 206.

At operation 210, process 200 receives a second message of a handshake messaging phase of the authentication protocol (e.g., handshake messaging phase 118). The second message includes a second cryptographic nonce and a second signed device certificate portion of a second (other) party to the handshake messaging phase. Operations 208 and 210 thereby exchange identity information between the first and second parties.

At operation 212, process 200 obtains the second party's device certificate by combining the second signed device certificate portion of the received second message of operation 210 with a partially pre-filled device certificate stored locally, pre-filled with at least some information. In some embodiments, combining may involve transferring information from the second signed device certificate portion to the partially pre-filled device certificate until a suitably complete device certificate is obtained. The pre-filled device certificate may be characterized herein as "complimentary" to the first signed device certificate portion and the second signed device certificate portion at least partially based on the fields of the device certificate portions corresponding to empty fields of the pre-filled device certificate.

At operation 214, process 200 verifies the second party's identity responsive to the identity information in the device certificate obtained at operation 212 and thereby obtains the second party's public key, which, as indicated in operation 204, was included in the second party's device certificate portion.

Figure 3:
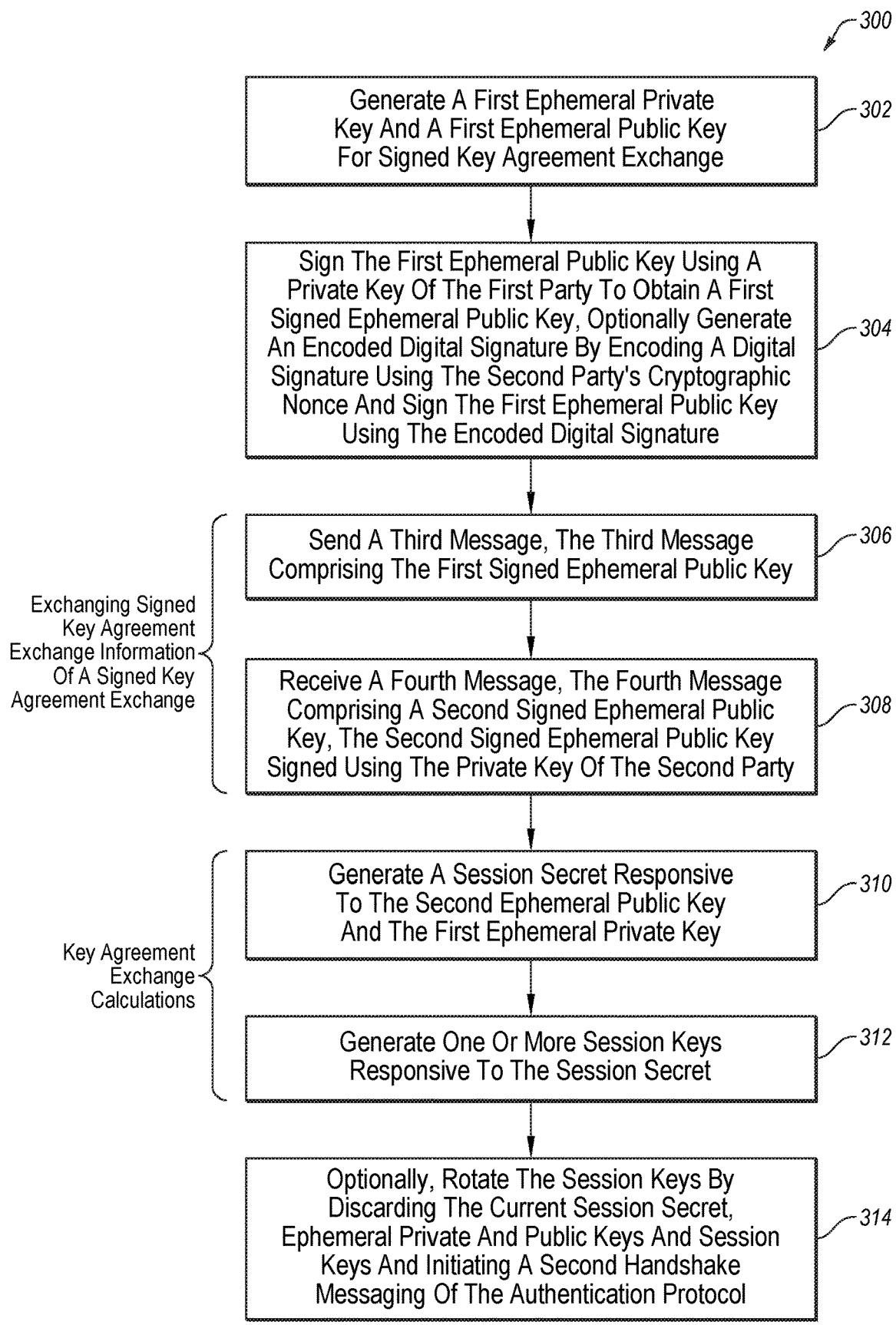
FIG. 3 illustrates a process in accordance with one or more embodiments.

FIG. 3 is a flowchart depicting a process 300 for performing a signed key agreement exchange in accordance with one or more embodiments, such as operation 112, operation 114 and/or operation 116 of authentication protocol 100.

At operation 302, process 300 generates a first ephemeral private key and a first ephemeral public key by performing a private/public key generation algorithms specified by the protocol for signed key agreement exchange being performed by the parties (e.g., Diffie-Hellman, without limitation).

At operation 304, process 300 signs the first ephemeral public key using a private key of the first party to obtain a first signed ephemeral public key. Each party may use its own private key to generate its digital signature and thereby "sign" the first ephemeral public key, provided a respective party was authenticated by process 200. Optionally, process 200 may generate an encoded digital signature by encoding the generated digital signature using the second party's cryptographic nonce (i.e., the second cryptographic nonce received with the second message in operation 210) and sign the first ephemeral public key using the encoded digital signature, thereby obtaining greater security.

At operation 306, process 300 sends a third message that includes the first signed ephemeral public key.

At operation 308, process 300 receives a fourth message that includes a second signed ephemeral public key, signed by a second (other) party using its own private key. The second signed ephemeral public key can be used because the receiver obtained the second party's public key in process 200.

Notably, the third and fourth messages of operations 306 and 308 form an exchange of signed key agreement exchange information of a signed key agreement exchange performed with a party to a handshake messaging phase.

In some embodiments, a party may transfer the first and second signed ephemeral public keys in signed device certificate portions. Some fields of such a device certificate portions may correspond to fields specified by a protocol for the signed key agreement exchange performed by the parties.

At operation 310, process 300 generates a session secret responsive to the second ephemeral public key (which corresponds to the second signed ephemeral public key) of the second party and the first ephemeral private key of the first party.

At operation 312, process 300 obtains session keys in response to the session secret. These session keys are associated with a specific communication session by the first signed and second ephemeral keys that were exchanged by the parties and respectively used by both parties to generate a session secret. Operations 310, 312 represent key agreement exchange calculations as described above in relation to operations 114, 116.

At optional operation 314, process 300 rotates the session keys of a current secure communication session by discarding the current session secret, ephemeral private and public keys, and session keys and initiating at least a portion of second handshake messaging phase 118 of the authentication protocol. New public/private ephemeral keys, session secrete, or session keys may be obtained by successfully performing the second handshake messaging phase, process 200 and process 300.

Figure 4:
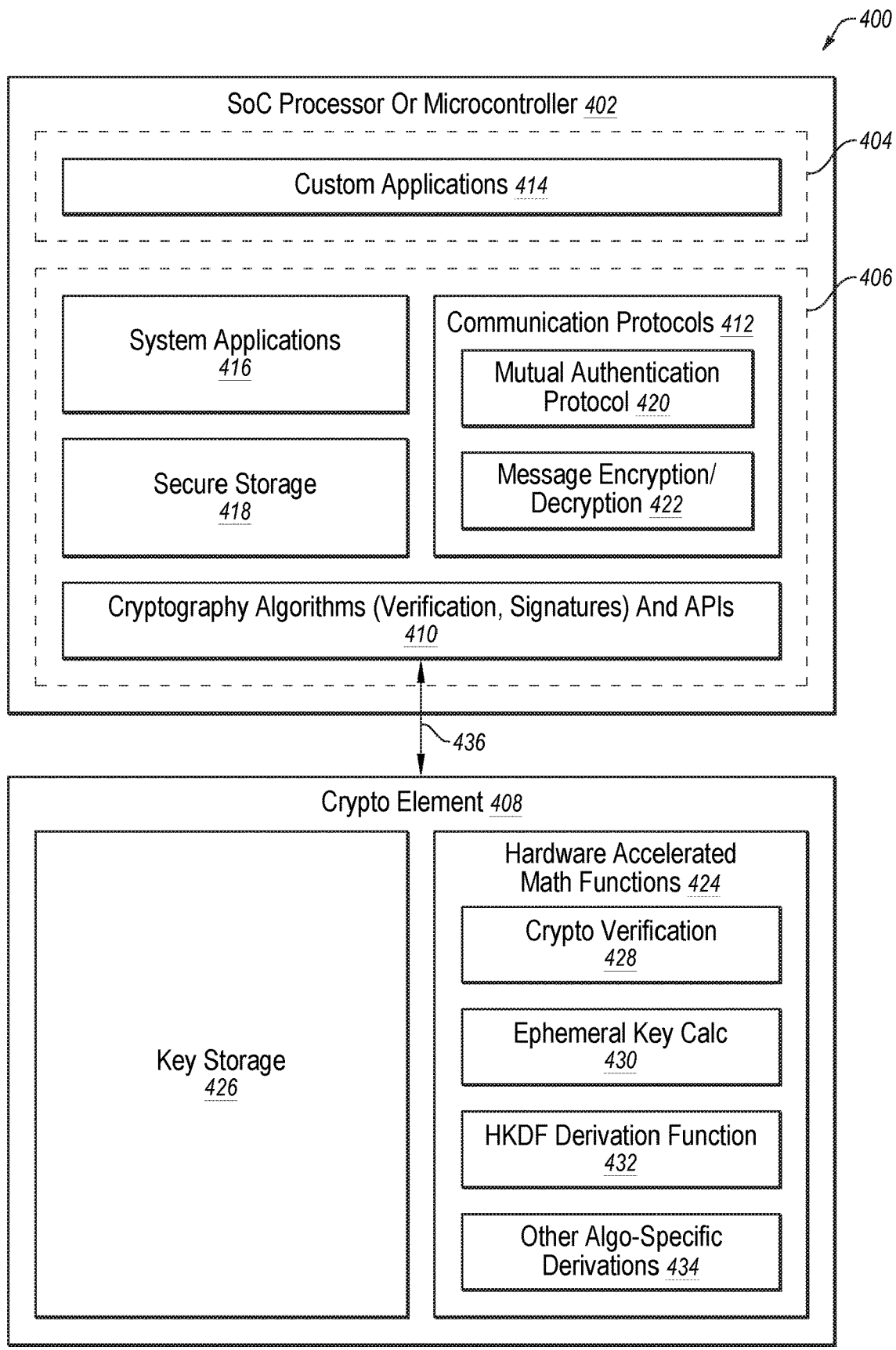
FIG. 4 illustrates a computing system in accordance with one or more embodiments.

FIG. 4 is a block diagram depicting an example computing system 400 (or computing apparatus) for performing operations of an authentication protocol 100, in accordance with one or more embodiments. Computing system 400 may include a system-on-a-chip (SoC) processor or microcontroller 402 coupled to a crypto element 408 via I/O protected link 436.

In the specific non-limiting example depicted by FIG. 4, SoC processor or microcontroller 402 includes machine-executable instructions for custom applications 414 of unsecure firmware 404, and machine-executable instructions for communication protocols 412, system applications 416, secure storage 418 and cryptography algorithms (verification, signatures) and application programming interfaces (APIs) 410 of secure firmware 406.

Cryptography algorithms (verification, signatures) and APIs 410 may be machine-executable instructions of protocols for communicating with crypto element 408 in support of communication protocols 412. Communication protocols 412 may include machine-executable instructions for communicating according to mutual authentication protocol 420 and for message encryption/decryption 422. In some embodiments, message encryption/decryption 422 may include machine-executable instructions for performing secure I/O communication with a device, such as crypto element 408, without limitation.

Crypto element 408 may be configured, generally, to support various cryptographic functions such as secure storage and cryptographic calculations, without limitation. As depicted by FIG. 4, crypto element 408 includes key storage 426 and hardware accelerated math functions 424.

Key storage 426 may comprise memory and machine-executable instructions for storing one or more of ephemeral private keys, session keys, and session secrets of authentication protocol 100, process 200 and process 300 discussed herein. Hardware accelerated math functions 424 may include machine-executable instructions for performing crypto verification 428, ephemeral key calculation 430 (e.g., a key derivation function for generating an ephemeral public key according a Diffie Helman protocol), HKDF derivation function 432 (i.e., a key derivation function that uses a hash-based simple key derivation function), and optionally other algo-specific derivations 434—in accordance with disclosed embodiments.

Though not included in the specific non-limiting example depicted by FIG. 4, in some embodiments, machine-executable instructions for a hash-based function for generating hash-based message authentication codes (HMACs) used for message authentication calculations based on a message and an HMAC key may be included in secure firmware 406 or hardware accelerated math functions 424.

Figure 5:
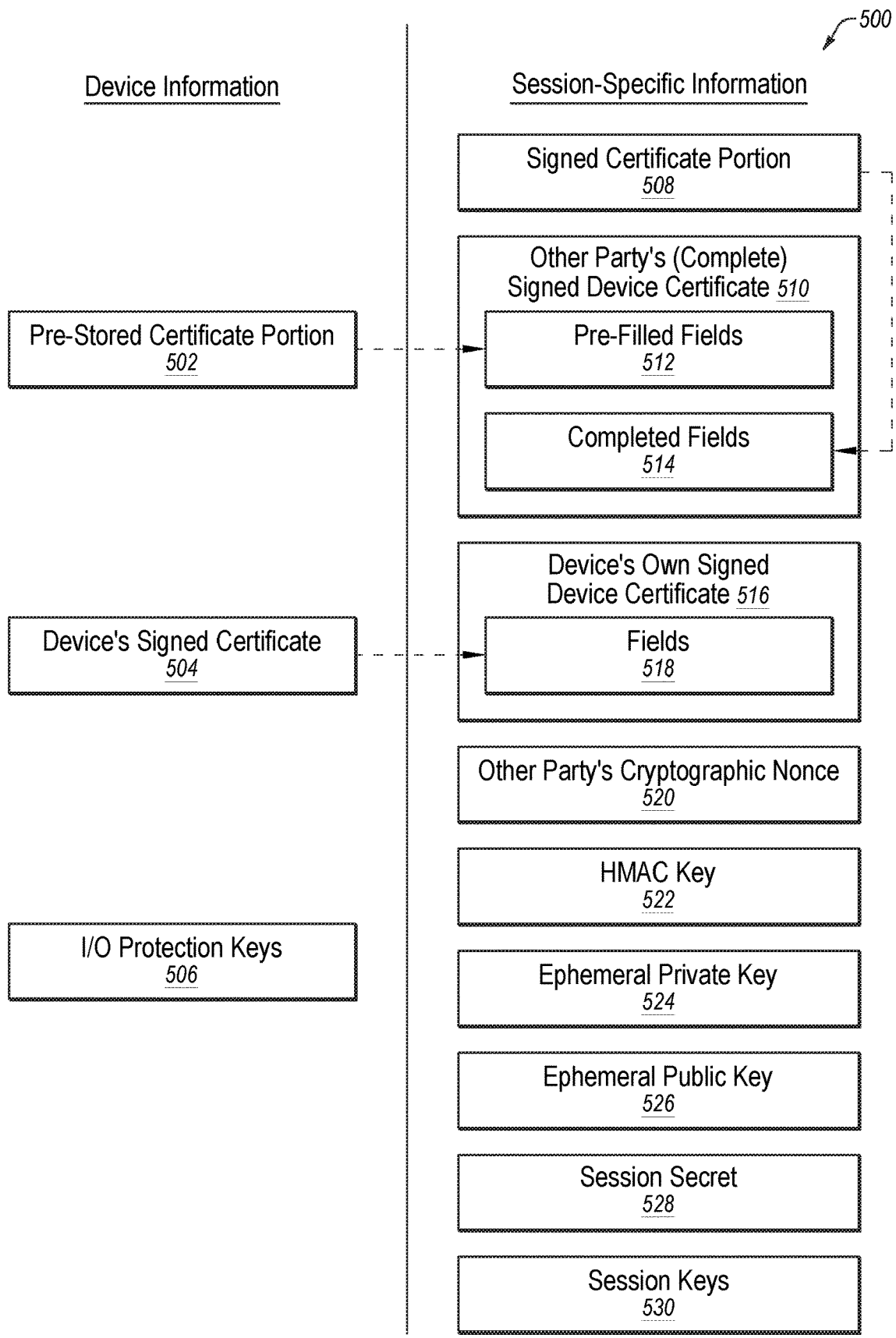
FIG. 5 illustrates a cryptographic information in accordance with one or more embodiments.

FIG. 5 is a block diagram depicting examples of cryptographic information 500 stored, generated, or used in accordance with one or more embodiments. One or more of the information of cryptographic information 500 may be stored at volatile or non-volatile memory used by unsecure firmware 404 or secure firmware 406, or a secure memory of crypto element 408 associated with key storage 426. As depicted by FIG. 5, device information may include pre-stored certificate portion 502, a device's signed certificate 504 and I/O protection keys 506 (e.g., used to establish I/O protected link 436).

Session-specific information may include cryptographic information associated with a specific communication session (e.g., encrypted communication phase 130) established in response to handshake messaging phase 118 of authentication protocol 100. As depicted by FIG. 5, cryptographic information of session-specific information may include the other party's completed signed device certificate 510, a device's own signed certificate portion 516, the other party's cryptographic nonce 520, an own ephemeral private key 524, the other party's ephemeral public key 526, a session secret 528, session keys 530, and an HMAC key 522.

As depicted by FIG. 5, another party's completed signed device certificate 510 may include pre-filled fields 512—i.e., pre-filled with information already stored locally. In the specific example depicted by FIG. 5, pre-filled fields 512 are filled using information of corresponding fields of pre-stored certificate portion 502, and completed fields 514 are filled using information from signed device certificate portion 508 received from the other party to a handshake messaging phase of an authentication protocol. The local device's own signed device certificate portion 516 may include fields 518 that are filled using information from a device's signed certificate 504. The remaining cryptographic information of session-specific information may be generated in accordance with operations of authentication protocol 100, process 200, and process 300 discussed above.

Figure 6:
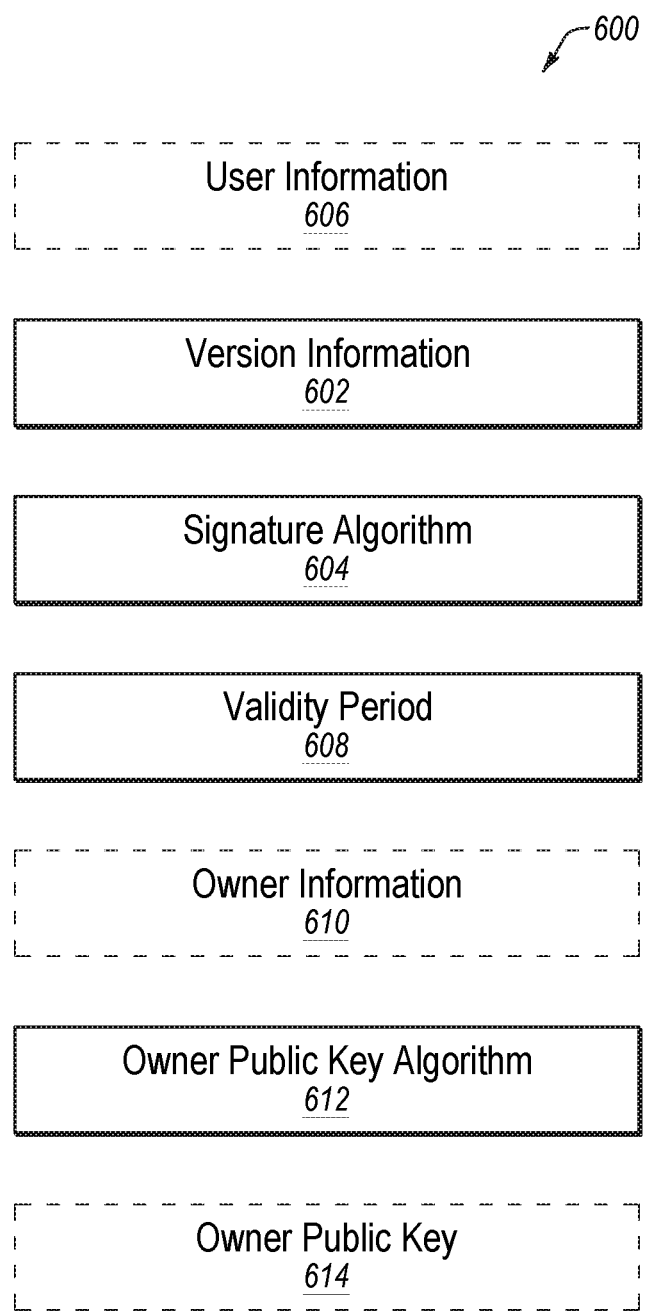
FIG. 6 illustrates a certificate in accordance with one or more embodiments.

FIG. 6 is a block diagram depicting a non-limiting example of a device certificate 600. Example device certificate 600 includes fields and information specified therein that may be transferred to a device certificate portion, such as fields for specifying issuer information 606, information about a party 610 (i.e., owner information), and a party's public key 614 (i.e., owner public key). Fields for specifying other information that is not necessarily transferred to a certificate portion includes fields for version information 602, signature algorithm 604, validity period 608, and owner public key algorithm 612.

Figure 7:
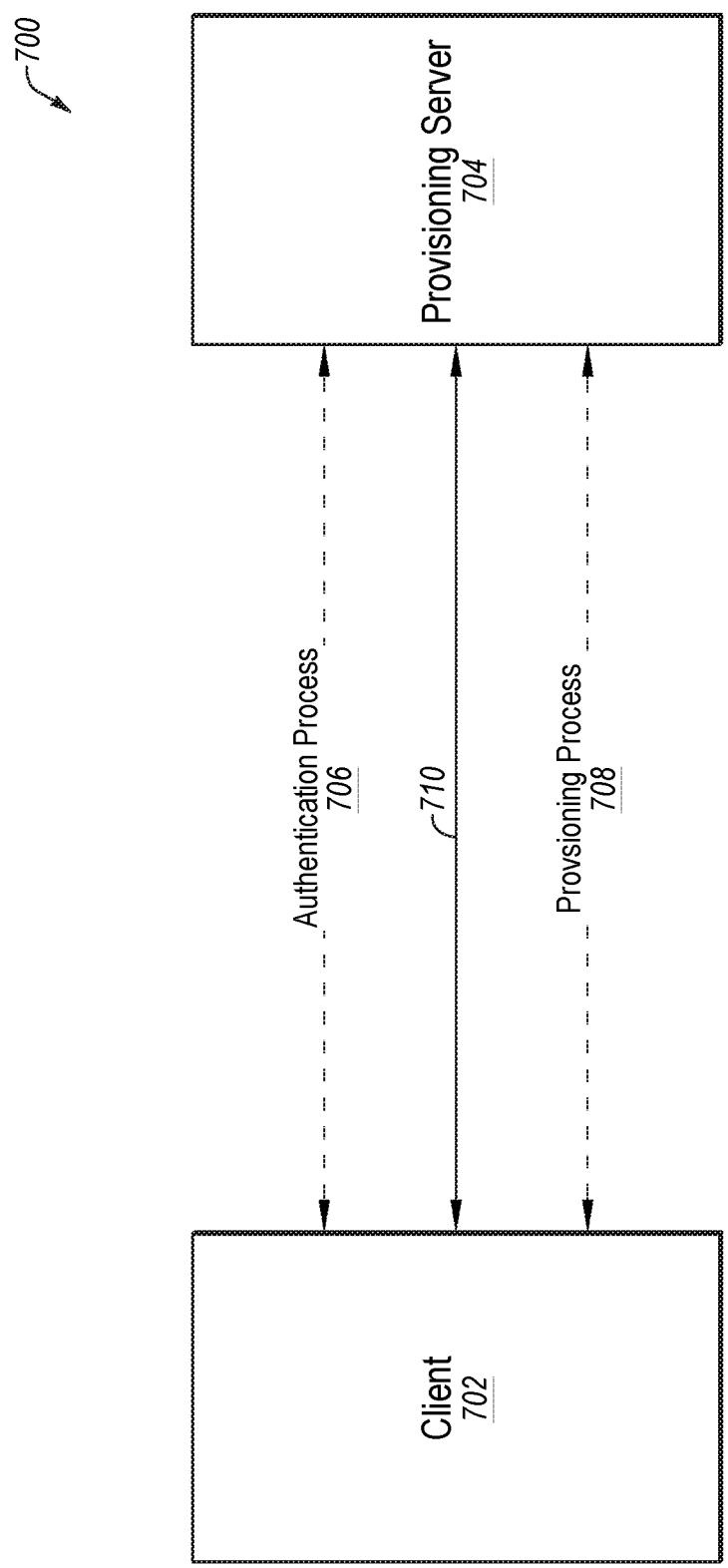
FIG. 7 illustrates a mutual authentication system in accordance with one or more embodiments.

FIG. 7 shows a block diagram of a mutual authentication system 700, in accordance with one or more embodiments. In this example, client 702 is in communication with provisioning server 704 that is configured to provide provisioning information for joining a system of related devices to client 702 pursuant to a provisioning process 708 after performing authentication process 706 (e.g., authentication protocol 100), both over communication link 710. Provisioning information may include, as a non-limiting example, configuration information for devices that are joining or are part of a system of low-throughput related devices.

Communication link 710 may be a connection for low-throughput data transmission (e.g., a low-throughput connection), such as a wired point-to-point (P2P) connection, a wireless P2P connection, or combinations thereof, without limitation. Wired and/or wireless connections for low-throughput data transmission may include one or more of: Bluetooth Low Energy (BLE), Lora, 2.4 GHz radio, sub-GHz radio, universal asynchronous receiver transmitter (USART) bus, serial peripheral interface (SPI) bus, inter-inter connect (I2C) bus, controller area network (CAN) bus, local interconnect network (LIN) bus, and a universal serial bus (USB), without limitation. As a non-limiting example, a low-throughput communication link may be a communication link configured for 10 kilobytes per second or less.

While performing authentication process 706, communication link 710 may be an unsecure connection during handshake messaging phase 118 and then a secure connection during encrypted communication phase 130. Provisioning process 708 may be performed during at least part of encrypted communication phase 130. Upon completion of provisioning process 708 then encrypted communication phase 130 may end (e.g., end secure communication session associated with encrypted communication phase 130).

By way of non-limiting example of a disadvantage of a conventional approach known to the inventors of this disclosure, such approaches are complex and require speed (e.g., data throughputs, without limitation) beyond what low power microcontrollers and low-throughput connections known to the inventors of this disclosure are capable of By way of another non-limiting example of a disadvantage of a conventional approach known to the inventors of this disclosure, secure elements such as Elliptical-Curve Cryptography (ECC) may help with math operations and storage, but are not used to secure a system by themselves—they are typically used to accelerate and protect operations and must be used properly by a protocol.

Figure 8:
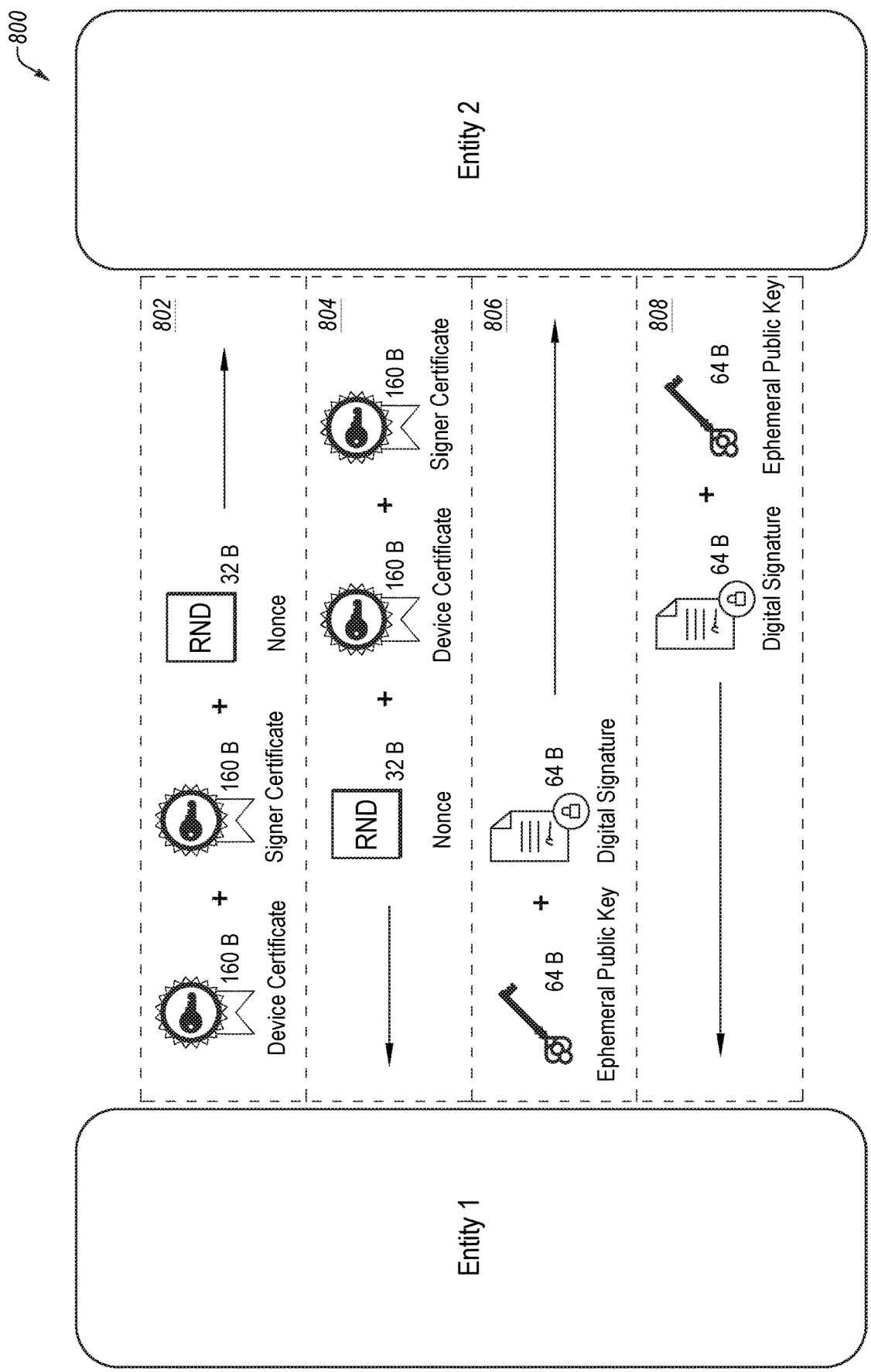
FIG. 8 illustrates example messaging for a handshake messaging phase of an authentication protocol.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 8 illustrates non-limiting examples of implementations of functional elements disclosed herein. In some embodiments, some or all portions of the functional elements disclosed herein may be performed by hardware specially configured for carrying out the functional elements.

FIG. 8 is a block diagram depicting example messaging 800 for a handshake messaging phase of an authentication protocol. First message 802 and second message 804 are sent as part of an identify information exchange such as identity information exchange of operation 106 of FIG. 1. As depicted, each message includes a device certificate portion (here a phone certificate) signed by a "signer," a signer certificate signed by a certificate authority, and a cryptographic nonce (here a 32 byte random number). Third message 806 and fourth message 808 are sent as part of an exchange of key agreement exchange information of a signed key agreement exchange protocol of operation 112 of FIG. 1. As depicted, each message includes a signed ephemeral public key (i.e., signed with a digital signature generated using the sender's ephemeral private key).

Figure 9:
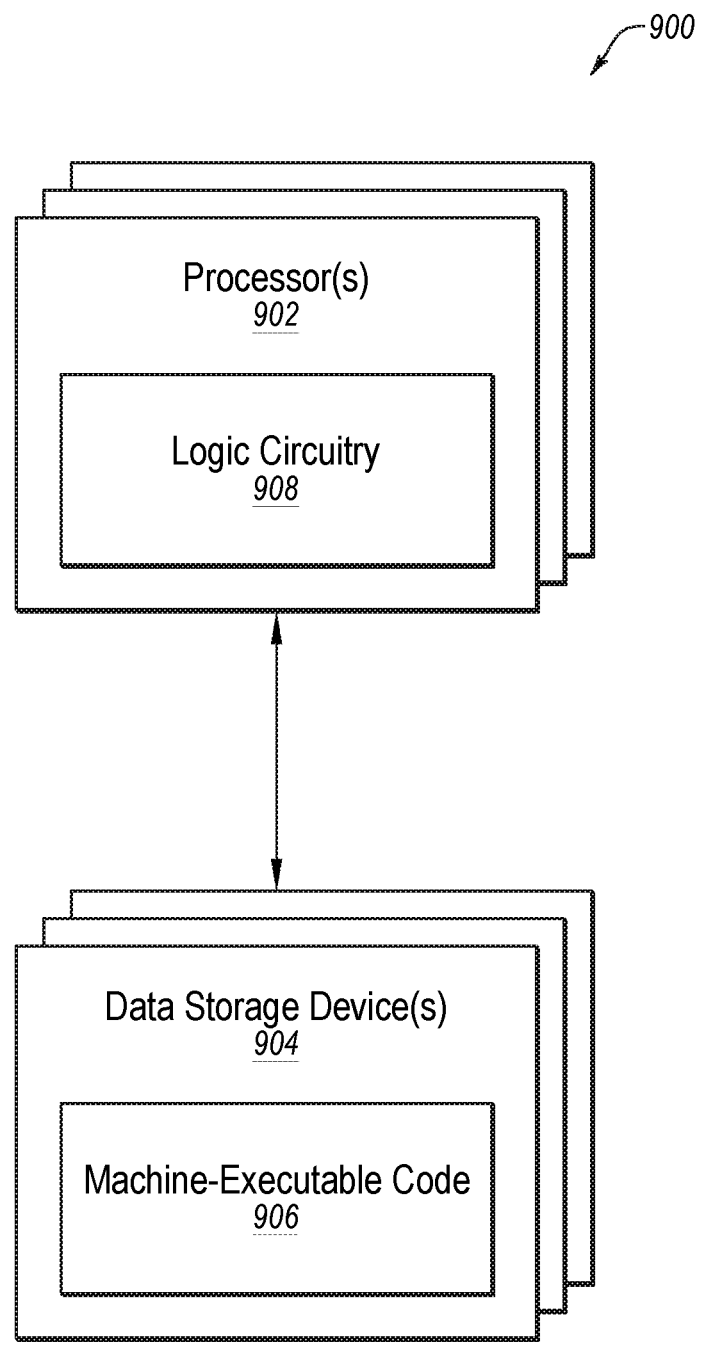
FIG. 9 illustrates an aspect of the subject matter in accordance with one or more embodiments.

FIG. 9 is a block diagram of circuitry 900 that, in some embodiments, may be used to implement various functions, operations, acts, processes, and/or methods disclosed herein. The circuitry 900 includes one or more processors 902 (sometimes referred to herein as "processors 902") operably coupled to one or more data storage devices (sometimes referred to herein as "storage 904"). The storage 904 includes machine-executable code 906 stored thereon and the processors 902 include logic circuitry 908. The machine-executable code 906 includes information describing functional elements that may be implemented by (e.g., performed by) the logic circuitry 908. The logic circuitry 908 is adapted to implement (e.g., perform) the functional elements described by the machine-executable code 906. The circuitry 900, when executing the functional elements described by the machine-executable code 906, should be considered as special purpose hardware configured for carrying out functional elements disclosed herein. In some embodiments the processors 902 may be configured to perform the functional elements described by the machine-executable code 906 sequentially, concurrently (e.g., on one or more different hardware platforms), or in one or more parallel process streams.

When implemented by logic circuitry 908 of the processors 902, the machine-executable code 906 is configured to adapt the processors 902 to perform operations of embodiments disclosed herein. For example, the machine-executable code 906 may be configured to adapt the processors 902 to perform at least a portion or a totality of the features and functions discussed with reference to computing system 400, and more specifically SoC processor or microcontroller 402, unsecure firmware 404, secure firmware 406, custom applications 414, system applications 416, secure storage 418, communication protocols 412, mutual authentication protocol 420, message encryption/decryption 422, cryptography algorithms (verification, signatures) and APIs 410, crypto element 408, key storage 426, hardware accelerated math functions 424, crypto verification 428, ephemeral key calc 430, HMAC key calc 434, and other algo-specific derivations. As another example, the machine-executable code 906 may be configured to adapt the processors 902 to perform at least a portion or a totality of the operations discussed for authentication protocol 100, process 200, and process 300. As a further example, the machine-executable code 906 may be configured to adapt the processors 902 to perform at least a portion or a totality of the operations discussed for mutual authentication system 700, client 702, and provisioning server 704.

The processors 902 may include a general purpose processor, a special purpose processor, a central processing unit (CPU), a microcontroller, a programmable logic controller (PLC), a digital signal processor (DSP), an application-specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine-executable code 906 (e.g., software code, firmware code, hardware descriptions) related to embodiments of the present disclosure. It is noted that a general-purpose processor (may also be referred to herein as a host processor or simply a host) may be a microprocessor, but in the alternative, the processors 902 may include any conventional processor, controller, microcontroller, or state machine. The processors 902 may also be implemented as a combination of computing devices, such as a combination of a DSP and a microprocessor, a plurality of microprocessors, one or more microprocessors in conjunction with a DSP core, or any other such configuration.

In some embodiments the storage 904 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 902 and the storage 904 may be implemented into a single device (e.g., a semiconductor device product, a system on chip (SOC), etc.). In some embodiments the processors 902 and the storage 904 may be implemented into separate devices.

In some embodiments the machine-executable code 906 may include computer-readable instructions (e.g., software code, firmware code). By way of non-limiting example, the computer-readable instructions may be stored by the storage 904, accessed directly by the processors 902, and executed by the processors 902 using at least the logic circuitry 908. Also by way of non-limiting example, the computer-readable instructions may be stored on the storage 904, transferred to a memory device (not shown) for execution, and executed by the processors 902 using at least the logic circuitry 908 Accordingly, in some embodiments the logic circuitry 908 includes electrically configurable logic circuitry 908.

In some embodiments the machine-executable code 906 may describe hardware (e.g., circuitry) to be implemented in the logic circuitry 908 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 908 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine-executable code 906 may include an HDL, an RTL, a GL description, a mask level description, other hardware description, or any combination thereof.

In embodiments where the machine-executable code 906 includes a hardware description (at any level of abstraction), a system (not shown, but including the storage 904) may be configured to implement the hardware description described by the machine-executable code 906. By way of non-limiting example, the processors 902 may include a programmable logic device (e.g., an FPGA or a PLC) and the logic circuitry 908 may be electrically controlled to implement circuitry corresponding to the hardware description into the logic circuitry 908. Also by way of non-limiting example, the logic circuitry 908 may include hard-wired logic manufactured by a manufacturing system (not shown, but including the storage 904 according to the hardware description of the machine-executable code 906.

Regardless of whether the machine-executable code 906 includes computer-readable instructions or a hardware description, the logic circuitry 908 is adapted to perform the functional elements described by the machine-executable code 906 when implementing the functional elements of the machine-executable code 906. It is noted that although a hardware description may not directly describe functional elements, a hardware description indirectly describes functional elements that the hardware elements described by the hardware description are capable of performing.

A person having ordinary skill in the art will appreciate many benefits and advantages of disclosed embodiments. By way of non-limiting example, disclosed embodiments may be used to port complex stacks over low-throughput hardware (e.g., network equipment). By way of another non-limiting example, disclosed embodiments may include compressing (e.g., decreasing, without limitation) the number and length of messages exchanged for handshake phase as compared to conventional protocols known to inventors of this disclosure (e.g., TLS, without limitation). By way of another non-limiting example, disclosed embodiments may ensure a mutual authentication and a secure pre-master secret exchange over ECDH in, as a specific non-limiting example, substantially one second over an 80 kilobits per second connection. By way of another non-limiting example, just two X.509 certificates may be sent to establish each party's identity. By way of another non-limiting example, disclosed embodiments may generate a set of three (3) derived keys different for every secure communication session to perform AES, CBC, and salted-HMAC for confidentiality and integrity. By way of another non-limiting example, disclosed embodiments may automatically perform session key rotation at periodic or random intervals. By way of another non-limiting example, disclosed embodiments may be used in networks for: access control, medical devices, patient monitoring, digital health, home and building automation, alarm systems, automotive, and military applications, without limitation.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, without limitation) of the computing system. In some embodiments, the different components, modules, engines, and services described in the present disclosure may be implemented as objects or processes that execute on the computing system (e.g., as separate threads, without limitation). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). As used herein, the term "each" means some or a totality. As used herein, the term "each and every" means a totality.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure include:

Embodiment 1: a method of performing a side of a mutual authentication handshake, the method comprising: exchanging identity information with a party via a first messaging of a handshake messaging phase, the first messaging comprising: sending a first message, the first message comprising a first cryptographic nonce and a first signed device certificate portion; and receiving a second message, the second message comprising a second cryptographic nonce and a second signed device certificate portion, and exchanging signed key agreement exchange information of a signed key agreement exchange with the party via a second messaging of the handshake messaging phase, the second messaging comprising: sending a third message, the third message comprising a first signed ephemeral public key; and receiving a fourth message, the fourth message comprising a second signed ephemeral public key.

Embodiment 2: the method according to Embodiment 1, further comprising: selecting information stored in one or more specific fields of a first device certificate; generating a first device certificate portion comprising the selected information; and signing the first device certificate portion responsive to a trusted third-party's digital signature to generate the first signed device certificate portion.

Embodiment 3: the method according to any of Embodiments 1 and 2, further comprising: obtaining a device certificate of the party by combining the second signed device certificate portion and a partially pre-filled device certificate.

Embodiment 4: the method according to any of Embodiments 1 through 3, wherein combining the second signed device certificate portion and the partially pre-filled device certificate comprises: combining the second signed device certificate portion with a portion of the pre-filled device certificate that is complimentary to the second public key signed device certificate portion.

Embodiment 5: the method according to any of Embodiments 1 through 4, further comprising: verifying the party's identity responsive to the obtained device certificate of the party.

Embodiment 6: the method according to any of Embodiments 1 through 5, further comprising: generating an encoded first digital signature by encoding a first digital signature responsive to the second cryptographic nonce; and signing the third message responsive to the encoded first digital signature.

Embodiment 7: the method according to any of Embodiments 1 through 6, further comprising: generating a session secret responsive to the second signed ephemeral public key and an ephemeral private key.

Embodiment 8: the method according to any of Embodiments 1 through 7, further comprising: rotate session keys of the secure communication session responsive to initiating a second handshake messaging phase.

Embodiment 9: a computing apparatus, comprising: a processor; and a memory having thereon machine-executable instructions that, when executed by the processor, configure the computing apparatus to: exchange identity information with a party via first handshake messages, the first handshake messages comprising: a first message, the first message comprising a first cryptographic nonce and a first signed device certificate portion; and a second message, the second message comprising a second cryptographic nonce and a second signed device certificate portion, and exchange first signed key agreement exchange information with the party via second handshake messages, the second handshake messages comprising: a third message, the third message comprising a first signed ephemeral public key; and a fourth message, the fourth message comprising a second signed ephemeral public key.

Embodiment 10: the computing apparatus according to Embodiment 9, wherein the machine-executable instructions comprise further machine-executable instructions that, when executed by the processor, configure the apparatus to: select information stored in one or more specific fields of a first device certificate; generate a first device certificate portion comprising the selected information; and sign the first device certificate portion responsive to a trusted third-party's digital signature to generate the first signed device certificate portion.

Embodiment 11: the computing apparatus according to any of Embodiments 9 and 10, wherein the machine-executable instructions comprise further machine-executable instructions that, when executed by the processor, configure the apparatus to: obtain the device certificate of the party by combining the second signed device certificate portion and a partially pre-filled device certificate.

Embodiment 12: the computing apparatus according to any of Embodiments 9 through 11, wherein the partially pre-filled device certificate is complimentary to the second signed device certificate portion.

Embodiment 13: the computing apparatus according to any of Embodiments 9 through 12, wherein the machine-executable instructions comprise further machine-executable instructions that, when executed by the processor, configure the apparatus to: verify the party's identity responsive to the obtained device certificate of the party.

Embodiment 14: the computing apparatus according to any of Embodiments 9 through 13, wherein the machine-executable instructions comprise further machine-executable instructions that, when executed by the processor, configure the apparatus to: generate an encoded first digital signature by encoding a first digital signature responsive to the second cryptographic nonce; and sign the third message responsive to the encoded first digital signature.

Embodiment 15: the computing apparatus according to any of Embodiments 9 through 14, wherein the machine-executable instructions comprise further machine-executable instructions that, when executed by the processor, configure the apparatus to: generate a session secret responsive to the second signed ephemeral public key and an ephemeral private key.

Embodiment 16: the computing apparatus according to any of Embodiments 9 through 15, wherein the machine-executable instructions comprise further machine-executable instructions that, when executed by the processor, configure the apparatus to: rotate the session keys of the secure communication session responsive to initiation of a second handshake messaging phase.

Embodiment 17: a data storage device, the data storage device including instructions that when executed by a processor, cause the processor to: exchange identity information with a party via first handshake messages, the first handshake messages comprising: a first message comprising a first cryptographic nonce and a first signed device certificate portion; and a second message comprising a second cryptographic nonce and a second signed device certificate portion, and exchange first signed key agreement exchange information with the party via second handshake messages, the second handshake messages comprising: a third message comprising a first signed ephemeral public key; and a fourth message comprising a second signed ephemeral public key.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method of performing a side of a mutual authentication handshake, the method comprising:
   at a device of a first party,
      exchanging identity information with a device of a second party via a first messaging of a handshake messaging phase, the first messaging comprising:
         sending a first message, the first message comprising a first cryptographic nonce and a first signed device certificate portion associated with the first party; and
         receiving a second message, the second message comprising a second cryptographic nonce and a second signed device certificate portion associated with the second party;
         verifying the second party's identity at the device of the first party at least partially based on the second signed device certificate portion;
      exchanging signed key agreement exchange information of a signed key agreement exchange with the device of the second party via a second messaging of the handshake messaging phase, the second messaging comprising:
         sending a third message, the third message comprising a first signed ephemeral public key including a first digital signature, the first digital signature generated with a first private key of the first party using a first ephemeral public key of the first party and the second cryptographic nonce from the second message; and
         receiving a fourth message, the fourth message comprising a second signed ephemeral public key including a second digital signature, the second digital signature generated with a second private key of the second party using a second ephemeral public key of the second party and the first cryptographic nonce from the first message; and
         obtaining the second ephemeral public key of the second party at least partially based on the second signed ephemeral public key and a public key of the second party, the public key of the second party obtained at least partially from the second signed device certificate portion associated with the second party.

2. The method of claim 1, further comprising:
   at the device of the first party,
      selecting information stored in one or more specific fields of a first device certificate;
      generating a first device certificate portion comprising the selected information; and signing the first device certificate portion responsive to a trusted third-party's digital signature to generate the first signed device certificate portion.

3. The method of claim 1, further comprising:
at the device of the first party,
obtaining a device certificate of the second party by combining the second signed device certificate portion and a partially pre-filled device certificate.

4. The method of claim 3, wherein combining the second signed device certificate portion and the partially pre-filled device certificate comprises: combining the second signed device certificate portion with a portion of the partially pre-filled device certificate that is complimentary to the second signed ephemeral public key and second signed device certificate portion.

5. The method of claim 1,
wherein the exchanging of the identity information and the exchanging of the signed key agreement exchange information is performed through a low-throughput connection of the device of the first party.

6. The method of claim 1, wherein:
a total number of first handshake messages for verification of identity is two messages including the first message and the second message, and
a total number of second handshake messages for signed key agreement exchange is two messages including the third message and the fourth message.

7. The method of claim 1, further comprising:
at the device of the first party,
generating a session secret responsive to the second ephemeral public key and an ephemeral private key; and
participating in a secure communication session with the device of the second party based on the session secret.

8. The method of claim 1, further comprising:
at the device of the first party,
rotate session keys of a secure communication session responsive to initiating a second handshake messaging phase.

9. A computing apparatus, comprising:
a processor; and
a memory having thereon machine-executable instructions that, when executed by the processor, configure the computing apparatus of a first party to:
exchange identity information with a computing apparatus of a second party via first handshake messages, the first handshake messages comprising:
a first message, the first message comprising a first cryptographic nonce and a first signed device certificate portion associated with the first party; and
a second message, the second message comprising a second cryptographic nonce and a second signed device certificate portion associated with the second party;
verify the second party's identity at the computing apparatus of the first party at least partially based on the second signed device certification portion;
exchange first signed key agreement exchange information with the computing apparatus of the second party via second handshake messages, the second handshake messages comprising:
a third message, the third message comprising a first signed ephemeral public key including a first digital signature, the first digital signature generated with a first private key of the first party using a first ephemeral public key of the first party and the second cryptographic nonce from the second message; and
a fourth message, the fourth message comprising a second signed ephemeral public key including a second digital signature, the second digital signature generated with a second private key of the second party using a second ephemeral public key of the second party and the first cryptographic nonce from the first message; and
obtain the second ephemeral public key of the second party at least partially based on the second signed ephemeral public key and a public key of the second party, the public key of the second party obtained at least partially from the second signed device certificate portion associated with the second party.

10. The computing apparatus of claim 9, wherein the machine-executable instructions comprise further machine-executable instructions that, when executed by the processor, configure the computing apparatus of the first party to:
select information stored in one or more specific fields of a first device certificate;
generate a first device certificate portion comprising the selected information; and
sign the first device certificate portion responsive to a trusted third-party's digital signature to generate the first signed device certificate portion.

11. The computing apparatus of claim 9, wherein the machine-executable instructions comprise further machine-executable instructions that, when executed by the processor, configure the computing apparatus of the first party to:
obtain a device certificate of the party by combining the second signed device certificate portion and a partially pre-filled device certificate.

12. The computing apparatus of claim 11, wherein the partially pre-filled device certificate is complimentary to the second signed device certificate portion.

13. The computing apparatus of claim 11, wherein the machine-executable instructions comprise further machine-executable instructions that, when executed by the processor, configure the computing apparatus of the first party to:
verify the party's identity responsive to the obtained device certificate of the party.

14. The computing apparatus of claim 9, wherein
a total number of first handshake messages for verification of identity is two messages including the first message and the second message, and
a total number of second handshake messages for signed key agreement exchange is two messages including the third message and the fourth message.

15. The computing apparatus of claim 9, wherein the machine-executable instructions comprise further machine-executable instructions that, when executed by the processor, configure the computing apparatus of the first party to:
generate a session secret responsive to the second ephemeral public key and an ephemeral private key; and
participate in a secure communication session with the computing apparatus of the second party based on the session secret.

16. The computing apparatus of claim 9, wherein the machine-executable instructions comprise further machine-executable instructions that, when executed by the processor, configure the computing apparatus of the first party to:
rotate session keys of a secure communication session responsive to initiation of a second handshake messaging phase.

17. A data storage device, the data storage device associated with a first party and including instructions that, when executed by a processor, cause the processor to:
- exchange identity information with a data storage device of a second party via first handshake messages, the first handshake messages comprising:
  - a first message comprising a first cryptographic nonce and a first signed device certificate portion associated with the first party; and
  - a second message comprising a second cryptographic nonce and a second signed device certificate portion associated with the second party;
- verify the second party's identity at the data storage device of the first party at least partially based on the second signed device certificate portion, and
- exchange first signed key agreement exchange information with the party via second handshake messages, the second handshake messages comprising:
  - a third message comprising a first signed ephemeral public key including a first digital signature, the first digital signature generated with a first private key of the first party using a first ephemeral public key of the first party and the second cryptographic nonce from the second message; and
  - a fourth message comprising a second signed ephemeral public key including a second digital signature, the second digital signature generated with a second private key of the second party using a second ephemeral public key of the second party and the first cryptographic nonce from the first message; and
- obtain a second ephemeral public key of the second party at least partially based on the second signed ephemeral public key and a public key of the second party, the public key of the second party obtained at least partially from the second signed device certificate portion associated with the second party.

18. A computing apparatus, comprising:
one or more processors; and
a memory having thereon machine-executable instructions that, when executed by the one or more processors, configure the computing apparatus of a first party of a mutual authentication handshake to:
- exchange identity information with a computing apparatus of a second party via first handshake messages, the first handshake messages comprising:
  - a first message, the first message comprising a first cryptographic nonce and a first signed device certificate portion associated with the first party; and
  - a second message, the second message comprising a second cryptographic nonce and a second signed device certificate portion associated with the second party;
- exchange first signed key agreement exchange information with the computing apparatus of the second party via second handshake messages, the second handshake messages comprising:
  - a third message, the third message comprising a first signed ephemeral public key including a first digital signature, the first digital signature generated with a first private key of the first party using a first ephemeral public key of the first party and the second cryptographic nonce from the second message; and
  - a fourth message, the fourth message comprising a second signed ephemeral public key including a second digital signature, the second digital signature generated with a second private key of the second party using a second ephemeral public key of the second party and the first cryptographic nonce from the first message.

19. The computing apparatus of claim 18, wherein the machine-executable instructions comprise machine-executable instructions that, when executed by the processor, configure the computing apparatus of the first party to:
- verify the second party's identity at the computing apparatus of the first party at least partially based on the second signed device certification portion; and
- obtain the second ephemeral public key of the second party at least partially based on the second signed ephemeral public key and a public key of the second party, the public key of the second party obtained at least partially from the second signed device certificate portion associated with the second party.

20. The computing apparatus of claim 18, wherein:
- a total number of first handshake messages for verification of identity is two messages including the first message and the second message, and
- a total number of second handshake messages for signed key agreement exchange is two messages including the third message and the fourth message.

* * * * *

UNITED STATES PATENT AND TRADEMARK OFFICE
CERTIFICATE OF CORRECTION

PATENT NO. : 12,088,741 B2
APPLICATION NO. : 16/948101
DATED : September 10, 2024
INVENTOR(S) : Paolo Trere It is certified that error appears in the above-identified patent and that said Letters Patent is hereby corrected as shown below:

In the Specification
    Column 13,    Line 50,    change "are capable of By" to --are capable of. By--

In the Claims
Claim 14,    Column 22,    Line 45,    change "claim 9, wherein" to --claim 9, wherein:--

Signed and Sealed this
Twenty-sixth Day of November, 2024

*Katherine Kelly Vidal*
Katherine Kelly Vidal
*Director of the United States Patent and Trademark Office*